(12) United States Patent
Hasegawa et al.

(10) Patent No.: US 9,196,391 B2
(45) Date of Patent: Nov. 24, 2015

(54) POLYUREA ELECTROLYTE AND METHOD FOR MANUFACTURING THE SAME

(75) Inventors: Takuya Hasegawa, Yokohama (JP); Shogo Takamuku, Sakura (JP); Tetsuya Samura, Kusatsu (JP); Hiroshi Tabata, Kyoto (JP); Toyo Yano, Kyoto (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 926 days.

(21) Appl. No.: 13/378,627

(22) PCT Filed: Jun. 10, 2010

(86) PCT No.: PCT/JP2010/059832
§ 371 (c)(1),
(2), (4) Date: Dec. 15, 2011

(87) PCT Pub. No.: WO2010/147044
PCT Pub. Date: Dec. 23, 2010

(65) Prior Publication Data
US 2012/0094212 A1 Apr. 19, 2012

(30) Foreign Application Priority Data
Jun. 19, 2009 (JP) ................................. 2009-146304

(51) Int. Cl.
*H01M 8/10* (2006.01)
*H01B 1/12* (2006.01)
*C08G 18/69* (2006.01)
(Continued)

(52) U.S. Cl.
CPC ................ *H01B 1/122* (2013.01); *C08G 18/10* (2013.01); *C08G 18/69* (2013.01); *C08G 18/757* (2013.01);
(Continued)

(58) Field of Classification Search
CPC ........................... H01M 8/103; H01M 8/1032
USPC ................................................. 429/400–535
See application file for complete search history.

(56) References Cited

U.S. PATENT DOCUMENTS 3,438,929 A * 4/1969 Appel ............................ 524/848
4,523,003 A * 6/1985 Bezwada ........................ 528/58
(Continued)

FOREIGN PATENT DOCUMENTS

GB 867539 A 5/1961
GB 1519864 A 8/1978
(Continued)

OTHER PUBLICATIONS

Akira Uno et al., "Synthesis of fluorescent polymers by interfacial polymerization reactions", Polymer Journal, 1974, vol. 6, No. 4, p. 267-273.
(Continued)

*Primary Examiner* — Jonathan G Leong
(74) *Attorney, Agent, or Firm* — Foley & Lardner LLP

(57) ABSTRACT

A polyurea electrolyte includes a polyurea resin formed by a polymerization of a first compound having two or more isocyanate groups and a second compound having two or more amino groups. The first compound or the second compound contains ten or more carbon chains, and the first compound or the second compound contains a sulfonic acid group or a carboxylic acid group. A method for manufacturing the polyurea electrolyte includes neutralizing the sulfonic acid group or the carboxylic acid group in the first compound or the second compound by a neutralizing agent; after the neutralizing, polymerizing the first compound and the second compound; and after the polymerizing, removing the neutralizing agent from a polymer of the first compound and the second compound.

13 Claims, 2 Drawing Sheets

(51) Int. Cl.
  *C08G 18/75* (2006.01)
  *C08G 18/10* (2006.01)
  *C08J 5/22* (2006.01)
(52) U.S. Cl.
  CPC .............. *C08J 5/2256* (2013.01); *H01M 8/103* (2013.01); *H01M 8/1027* (2013.01); *C08J 2375/02* (2013.01); *H01M 8/1032* (2013.01); *Y02E 60/521* (2013.01)

(56) References Cited

U.S. PATENT DOCUMENTS

| | | | |
|---|---|---|---|
| 2005/0147861 | A1 | 7/2005 | Sonai et al. |
| 2006/0025520 | A1 | 2/2006 | Sonai et al. |
| 2006/0089441 | A1 | 4/2006 | Endo |
| 2007/0287051 | A1* | 12/2007 | Onuma et al. .................. 429/33 |

FOREIGN PATENT DOCUMENTS

| | | |
|---|---|---|
| JP | 51-042530 A | 4/1976 |
| JP | 2003-335835 A | 11/2003 |
| JP | 2005-171086 A | 6/2005 |
| JP | 2006-040709 A | 2/2006 |
| JP | 2006-120518 A | 5/2006 |
| JP | 3901580 B2 | 1/2007 |
| JP | 2007-165046 A | 6/2007 |
| JP | 2007-207522 A | 8/2007 |
| JP | 2009-193682 A | 8/2009 |
| JP | 2010-015960 A | 1/2010 |
| JP | 2010-095606 A | 4/2010 |

OTHER PUBLICATIONS

Shao-Ming Lee et al., "The effect of the length of the oxyethylene chain on the conductivity of the polyurethane urea electrolyte", Electrochimica Acta, 2004, vol. 49, No. 27, p. 4907-4913.

Shao-Ming Lee et al., "Conductivity and characterization of polyurea electrolytes with carboxylic acid", Journal of Polymer Science, Part A: Polymer Chemistry, 2003, vol. 41, No. 24, p. 4007-4016.

* cited by examiner

POLYUREA ELECTROLYTE AND METHOD FOR MANUFACTURING THE SAME

TECHNICAL FIELD

The present invention relates to a polyurea electrolyte that has a preferable mechanical strength and resistance to acid as an electrolyte membrane for a fuel cell, and relates to a method for manufacturing the polyurea electrolyte.

BACKGROUND ART

In view of the recent global environmental problems, the issues on development and dissemination of clean energy are being addressed globally. Among the clean energy sources, a fuel cell is receiving attention in recent years because of a low-emission and highly-efficient source. A fuel cell electrochemically oxidizes a fuel such as hydrogen and methanol by use of oxygen or air, and converts chemical energy of the fuel into electrical energy to be extracted. There are various types of fuel cells such as an alkaline type, a phosphate type, a molten carbonate type, a solid electrolyte type and a polymer electrolyte type, according to the type of electrolyte provided therein. Among these fuel cells, a polymer electrolyte fuel cell is highly expected to serve as a power source for a vehicle and household use because the polymer electrolyte fuel cell is operable in low temperature, is easy to handle, and has high power density.

In order to put a polymer electrolyte fuel cell into practical use particularly in a fuel cell for a vehicle, a reduction in size and high output power have been required. Therefore, it is necessary to reduce the thickness of an electrolyte and the volume of the fuel cell itself, as well as to decrease the internal resistance of the fuel cell. For this reason, developments of a hydrocarbon electrolyte membrane are being promoted, in addition to a conventional fluorine electrolyte membrane. As compared with a fluorine electrolyte membrane, a hydrocarbon electrolyte membrane has the advantages of manufacturing with inexpensive raw materials and simple steps, and being highly selective for materials. However, hydrocarbon electrolyte membranes developed in recent years are generally made from super engineering plastic having high resistance to heat and high rigidity as a base material. Thus, the hydrocarbon electrolyte membranes have high rigidity but have little flexibility and substantially low toughness. In addition, there is a problem of release of a sulfonic acid group under a high temperature condition. Therefore, the resolution of these problems is strongly desired.

In order to improve a mechanical strength, a polyurea electrolyte of which a side chain includes an ionizing functional group at a side chain, and a fuel cell using the polyurea electrolyte have been disclosed in recent years (for example, refer to Patent Literature 1 and Patent Literature 2). In addition, a proton conductive composite membrane has been proposed, in which a porous membrane in polyurea resin is filled with an acrylamide electrolyte (for example, refer to Patent Literature 3).

CITATION LIST

Patent Literature

Patent Literature 1: Japanese Patent Unexamined Publication No. 2006-040709
Patent Literature 2: Japanese Patent Unexamined Publication No. 2006-120518
Patent Literature 3: Japanese Patent Unexamined Publication No. 2007-207522

SUMMARY OF INVENTION

Technical Problem

In the polyurea electrolytes described in Patent Literature 1 and Patent Literature 2, the side chain is added thereto after the synthesis of urea resin by use of active hydrogen at a urea bonding site. Therefore, since the active hydrogen is lost, a cohesion force between the urea bonding sites is decreased and a mechanical strength is decreased. In addition, resistance to acid and resistance to water are also decreased.

In the proton conductive composite membrane in Patent Literature 3, the electrolyte is unevenly provided at the pore portions of the porous membrane in the polyurea resin. As a result, an increase in proton conductive resistance is caused in the entire membrane. When the thickness of the membrane is decreased so as to decrease the proton conductive resistance, a mechanical strength of the porous substrate is decreased. In addition, the proton conductive composite membrane has a problem that a sulfonic acid tends to be easily released because of hydrolysis of acrylamide.

The present invention has been made in view of the conventional problems described above. It is an object of the present invention to provide a polyurea electrolyte that has an excellent mechanical strength, resistance to water, resistance to acid and durability, and a method for manufacturing the polyurea electrolyte.

Solution to Problem

A polyurea electrolyte according to the present invention includes a polyurea resin formed by a polymerization of a first compound having two or more isocyanate groups and a second compound having two or more amino groups. The first compound or the second compound contains ten or more carbon chains, and the first compound or the second compound contains a sulfonic acid group or a carboxylic acid group.

A method for manufacturing the polyurea electrolyte according to the present invention includes neutralizing the sulfonic acid group or the carboxylic acid group in the first compound or the second compound by a neutralizing agent; after the neutralizing, polymerizing the first compound and the second compound; and after the polymerizing, removing the neutralizing agent from a polymer of the first compound and the second compound.

Advantageous Effects of Invention

The polyurea electrolyte according to the present invention has an excellent mechanical strength since the polyurea electrolyte has a urea bond to form a hard segment in the molecule thereof. In addition, the polyurea electrolyte has excellent flexibility since the polyurea electrolyte has a structure formed of ten or more carbon chains to form a soft segment in the molecule thereof. Further, the polyurea electrolyte has excellent resistance to acid and resistance to water since the ten or more carbon chains in the polyurea electrolyte has a relatively strong hydrophobic property so as to protect a urea bonding site against the approach of acid and water.

DESCRIPTION OF EMBODIMENTS

Figure 1:
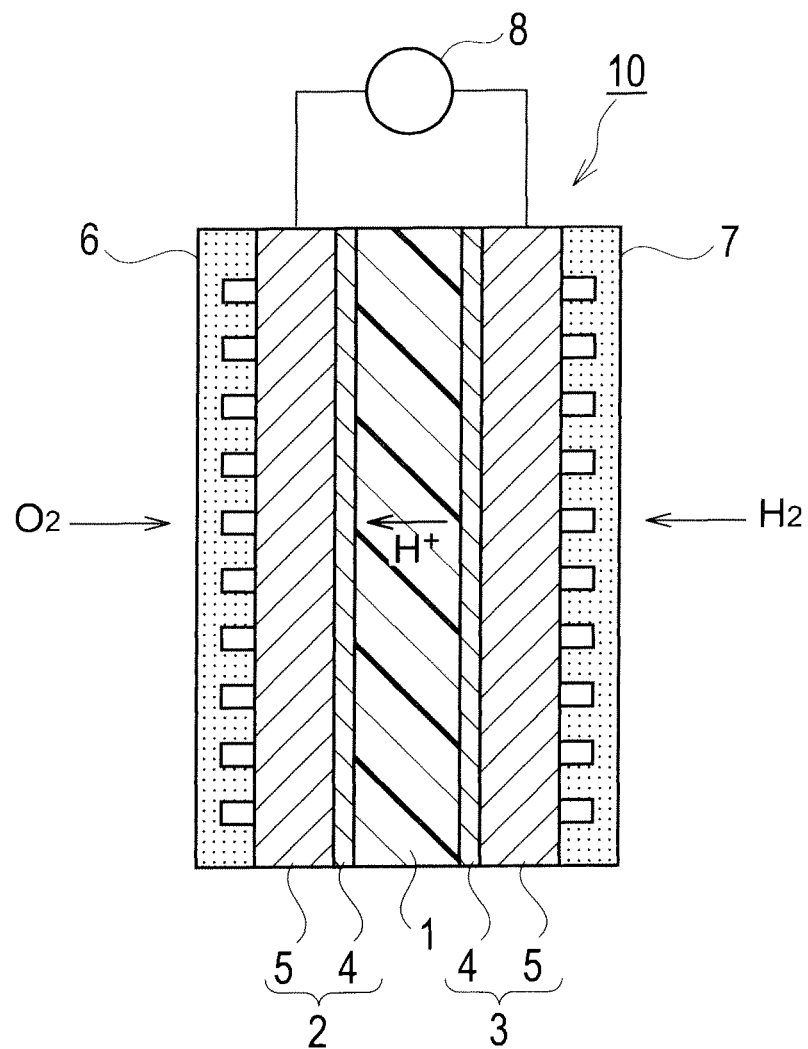
FIG. 1 is a schematic view showing a single cell of a polymer electrolyte fuel cell using a polyurea electrolyte according to an embodiment of the present invention as an electrolyte membrane.

A description will be made below in detail of a polyurea electrolyte and a method for manufacturing the polyurea electrolyte according to the embodiment of the present invention with reference to the drawings. Note that, the dimensional ratios in the drawings are exaggerated for convenience of explanation, and may be different from the actual ratios.

[Polyurea Electrolyte]

The polyurea electrolyte according to the embodiment of the present invention contains polyurea resin formed by the polymerization of a first compound having two or more isocyanate groups (—NCO) and a second compound having two or more amino groups (—NH$_2$). The first compound or the second compound contains ten or more carbon chains, and the first compound or the second compound contains a sulfonic acid group (—SO$_3$H) or a carboxylic acid group (—CO$_2$H).

More specifically, as represented by the chemical formula 1, the polyurea resin having a urea bond can be obtained by the polymerization of the first compound (isocyanate compound) having two or more isocyanate groups and the second compound (amino compound) having two or more amino groups. In the polyurea resin, a molecular chain R$^1$ in the first compound or a molecular chain R$^2$ in the second compound contains ten or more carbon chains. In addition, the molecular chain R$^1$ in the first compound or the molecular chain R$^2$ in the second compound contains a sulfonic acid group or a carboxylic acid group.

[Chem. 1]

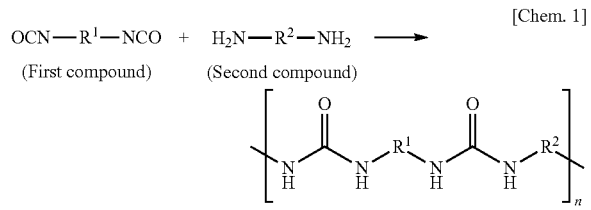

The carbon chains in the polyurea electrolyte represent carbon atoms continuously aligned in a main chain direction, and generally have ten or more carbon atoms. The number of the carbon atoms in the present embodiment is preferably between 10 and 300, more preferably 10 and 130, still more preferably 12 and 100, still even more preferably between 12 and 80. When the number of the carbon chains is within the above-mentioned range, sufficient resistance to water, resistance to acid, flexibility and proton conductivity can be obtained.

Although there are no particular limitations on the structure of the carbon chains, examples thereof may include structures of higher alkane, higher alkene, higher cycloalkane, higher cycloalkene, and a dimer and a trimer thereof. In addition, the carbon chains may have a structure in which a compound not containing a hetero element is polymerized. Examples of the compound not containing a hetero element include a conjugated diene compound such as 1,3-butadiene, isoprene, 2,3-dimethyl-1,3-butadiene and 1,3-pentadiene, and an olefin compound such as ethylene, propylene and butene. When the conjugated diene compound is used, hydrogen may be added to an unsaturated bond as necessary.

The carbon chains may include a side chain without departing from the scope of the present invention. It is to be noted that a side chain not containing a hetero element is preferable in order to ensure a sufficient hydrophobic property derived from the carbon chains.

There are no particular limitations on the molecular weight of the first compound or the second compound including ten or more carbon chains, but the molecular weight is between 200 and 3700, preferably between 200 and 1700, more preferably between 200 and 1200. When the molecular weight is within the above-mentioned range, the electrolyte having excellent flexibility, mechanical strength, resistance to water, resistance to acid, durability and proton conductivity can be obtained.

There are no particular limitations on the equivalent weight in the electrolyte according to the present embodiment, but the equivalent weight is 2000 or less, preferably 1500 or less, more preferably 1000 or less, still more preferably 800 or less, particularly preferably 500 or less. In addition, the equivalent weight is preferably 300 or more. Note that, the equivalent weight is an equivalent weight of a sulfonic acid group in the polyurea electrolyte, or an equivalent weight of a carboxylic acid group in the polyurea electrolyte. The equivalent weight of the sulfonic acid group represents a membrane weight of the polyurea electrolyte per sulfonic acid group equivalent. The equivalent weight of the carboxylic acid group represents a membrane weight of the polyurea electrolyte per carboxylic acid group equivalent. When the equivalent weight is 2000 or less, sufficient proton conductivity can be obtained. In addition, when the equivalent weight is 300 or more, the electrolyte may have improved resistance to water, resistance to acid, durability and mechanical strength, which is preferable for a fuel cell.

As described above, the electrolyte according to the present embodiment is required to contain ten or more carbon chains, and a sulfonic acid group or a carboxylic acid group. In addition, at least one of the first compound and the second compound may contain ten or more carbon chains, or both the first compound and the second compound may contain ten or more carbon chains. In other words, at least one of the molecular chains R$^1$ and R$^2$ in the chemical formula 1 may contain ten or more carbon chains. Further, at least one of the first compound and the second compound may contain a sulfonic acid group or a carboxylic acid group, or may contain both the sulfonic acid group and the carboxylic acid group. Namely, at least one of the molecular chains R$^1$ and R$^2$ in the chemical formula 1 may contain a sulfonic acid group or a carboxylic acid group, or may contain both the sulfonic acid group and the carboxylic acid group.

When at least one of the first compound and the second compound contains ten or more carbon chains, and contains a sulfonic acid group or a carboxylic acid group, the other one of the first compound and the second compound does not necessarily contain ten or more carbon chains, and does not necessarily contain a sulfonic acid group and a carboxylic acid group.

Preferable examples of the electrolyte according to the present embodiment include an electrolyte (A) in which the first compound contains ten or more carbon chains, and the second compound contains a sulfonic acid group or a carboxylic acid group, and an electrolyte (B) in which the first compound contains a sulfonic acid group or a carboxylic acid group, and the second compound contains ten or more carbon chains. The most preferable example of the electrolyte of the present embodiment is the electrolyte (A), and the explanation thereof will be made below with reference to some examples.

<First Compound>

The first compound having two or more isocyanate groups in the present embodiment is preferably an isocyanate compound containing ten or more carbon chains. The above-described first compound is not particularly limited, but may be a compound (a) in which both terminals of conjugated diene glycol and a hydrogenated substance thereof are substituted by an isocyanate group.

The conjugated diene glycol and the hydrogenated substance thereof are not particularly limited, but preferable examples thereof include polybutadiene glycol and a hydrogenated substance thereof, and polyisoprene glycol and a hydrogenated substance thereof, which contain a 1,4 bond or a 1,2 bond. A more preferable example is a hydrogenated substance of polybutadiene glycol or polyisoprene glycol containing a 1,4 bond or a 1,2 bond. As for the polybutadiene glycol, the structure represented by the chemical formula 2 is preferable.

[Chem. 2]

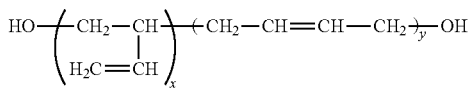

In the formula, x represents the degree of polymerization of the 1,2 bond, and y represents the degree of polymerization of the 1,4 bond.

As for the hydrogenated substance of the polyisoprene glycol, the structure such as the one represented by the chemical formula 3 is preferable.

[Chem. 3]

$$HO-\left(CH_2-CH-CH_2-CH_2\right)_z-OH$$
$$\qquad\qquad\quad|$$
$$\qquad\qquad\;CH_3$$

In the formula, z represents the degree of polymerization.

Another example of the first compound may be a compound (b) in which both terminals of vegetable oil containing a hydroxyl group, a carboxylic acid group or an amine group are substituted by an isocyanate group. Examples of the vegetable oil include drying oil (such as linseed oil, tung oil, perilla oil and sunflower oil), and semidrying oil (such as rapeseed oil, rice bran oil, corn oil, cottonseed oil and sesame oil).

The method of converting the respective both terminals of (a) the conjugated diene glycol and the hydrogenated substance thereof and (b) the vegetable oil containing a hydroxyl group, a carboxylic acid group or an amine group, into the isocyanate group is not particularly limited, and a conventionally known method may be used. For example, the terminal hydroxyl groups of (a) and (b) are bonded to an isocyanate compound having a low molecular weight to form a urethane bond (-NHC(=O)O—), so as to convert the terminals into the isocyanate group.

Examples of the isocyanate compound having a low molecular weight to be used include 2,4- or 2,6-tolylene diisocyanate, 4,4'- or 2,4'-diphenylmethane diisocyanate, and isophorone diisocyanate. Hereinafter, 2,4- or 2,6-tolylene diisocyanate is abbreviated to TDI, 4,4'- or 2,4'-diphenylmethane diisocyanate is abbreviated to MDI, and isophorone diisocyanate is abbreviated to IPDI.

Still another example of the first compound may be a compound (c) in which a carboxylic acid group or an amine group in vegetable oil containing a carboxylic acid group or an amine group is substituted by an isocyanate group. A method of converting (c) the carboxylic group or the amine group in the vegetable oil containing a carboxylic acid group or an amine group into the isocyanate group is not particularly limited, and a conventionally known method may be used.

One of the other preferable examples of the first compound is dimer acid diisocyanate. Dimer acid diisocyanate is diisocyanate that is induced by a compound in which two fatty acids are dimerized, and is characterized by a long-chain hydrocarbon structure provided in the molecule thereof. The dimer acid diisocyanate has a structure such as the one represented by the chemical formula 4.

[Chem. 4]

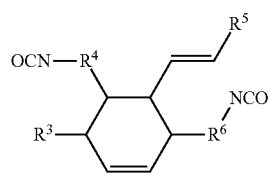

In the formula, $R^3$ and $R^5$ are linear alkyl groups, and $R^4$ and $R^6$ are linear alkylene groups.

When the dimer acid diisocyanate is used as the first compound, the polyurea electrolyte exerting excellent resistance to water, resistance to acid and flexibility can be obtained due to the characteristic structure thereof, as compared with the case of aliphatic diisocyanate.

With regard to the dimer acid diisocyanate, it is preferable to use diisocyanate that is induced by a compound in which olein acid and linoleic acid are dimerized. However, the present invention is not limited to such diisocyanate. Examples of the dimer acid in which olein acid and linoleic acid are dimerized include an acyclic type and a monocyclic type represented by the chemical formula 5. As represented by the chemical formula 5, a compound in which the terminal carboxylic acid group of the dimer acid is substituted by an isocyanate group by a conventionally known method may be used as the first compound.

[Chem. 5]

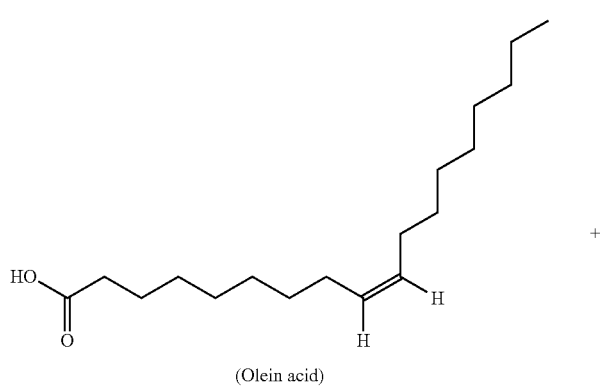

(Olein acid)

-continued

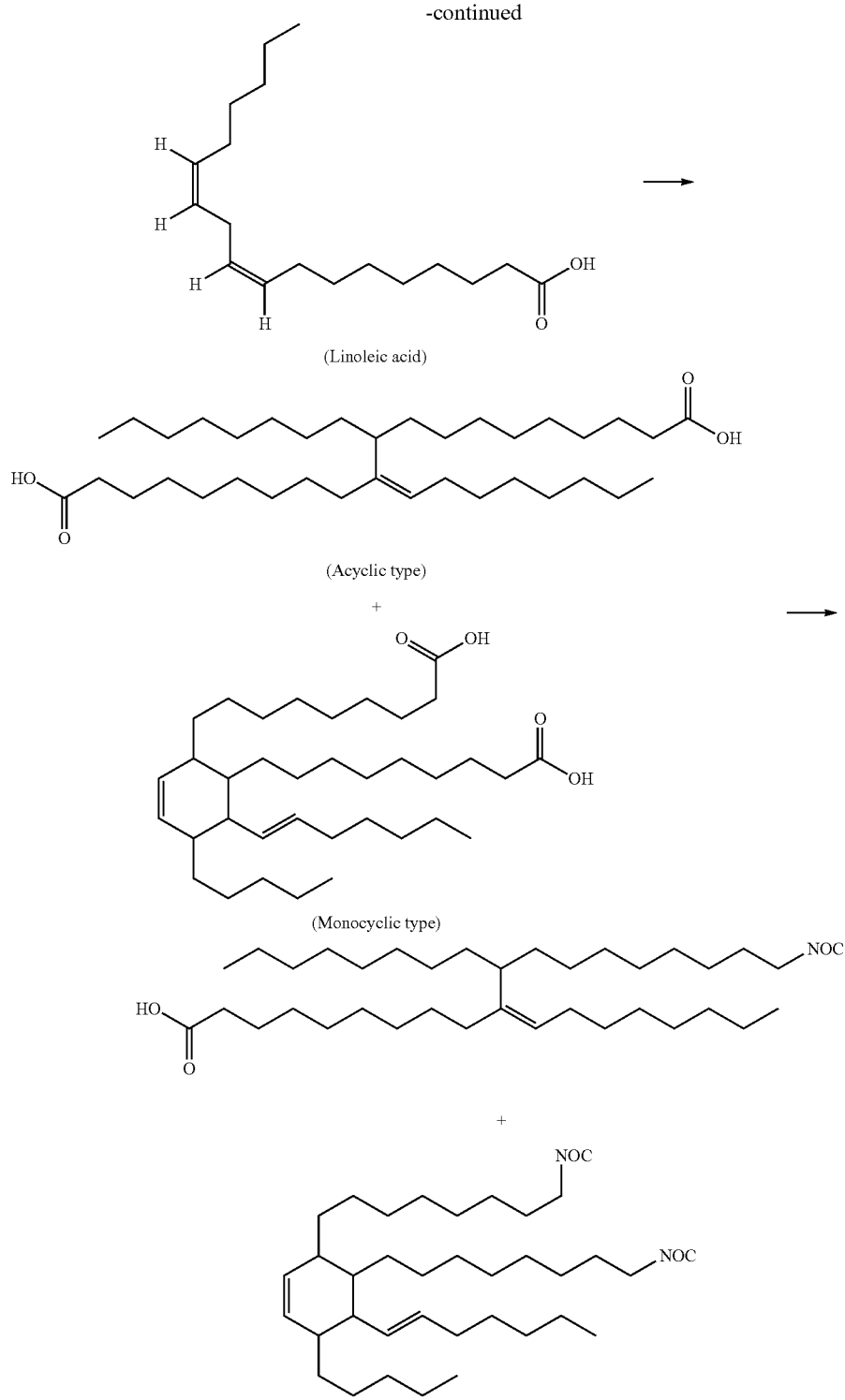

(Linoleic acid)

(Acyclic type)

(Monocyclic type)

In addition, norbornane diisocyanate, dicyclohexyl diisocyanate and tetramethyl xylylene diisocyanate may be used as the first compound.

It is preferable to use the above-described examples of the first compound for the polyurea electrolyte according to the present embodiment. However, an isocyanate compound (A-1) containing neither ten or more carbon chains nor a sulfonic acid group or a carboxylic acid group may be used in combination therewith. The isocyanate compound (A-1) used in combination is not particularly limited, but examples thereof include aromatic polyisocyanate, aliphatic polyisocyanate, alicyclic polyisocyanate, and prepolymers thereof.

Examples of the aromatic polyisocyanate of the isocyanate compound (A-1) include 1,3- or 1,4-phenylene diisocyanate, TDI, MDI, 1,5-naphthalene diisocyanate, m-xylylene diisocyanate, tetramethyl xylylene diisocyanate, and derivatives thereof.

Examples of the aliphatic polyisocyanate of the isocyanate compound (A-1) include tetramethylene diisocyanate, hexamethylene diisocyanate, lysine triisocyanate, and derivatives thereof.

Examples of the alicyclic polyisocyanate of the isocyanate compound (A-1) include IPDI, dicyclohexyl-4,4'-diisocyanate, 1,3-bis(isocyanatomethyl)cyclohexane, norbornene diisocyanate, trans-cyclohexane diisocyanate, and derivatives thereof.

The isocyanate compound (A-1) is preferably the aromatic polyisocyanate. Particularly, TDI, MDI, and the derivatives thereof are more preferable. The additive amount of the isocyanate compound (A-1) to the first compound is 20 parts or less, preferably 10 parts or less when the entire first compound is defined as 100 parts.

<Second Compound>

The second compound having two or more amino groups in the present embodiment is preferably a compound containing a sulfonic acid group or a carboxylic acid group. Particularly, the second compound is more preferably a compound containing a sulfonic acid group, and having an aromatic ring.

As a representative preferable compound of the second compound, a sulfonated diamine may be used. The method for producing the sulfonated diamine is not particularly limited, and a conventionally known method may be used. For example, an aromatic diamine is sulfonated by a sulfonating agent such as concentrated sulfuric acid to obtain the sulfonated diamine.

Examples of the sulfonated diamine include 2,2'-benzidinedisulfonic acid, diaminobenzene sulfonic acid, (4,4'-diaminodiphenyl ether)sulfonic acid, (4,4'-diaminodiphenyl sulfone)sulfonic acid, 2.2'-bis[4-(4-aminophenoxy)phenyl]propanesulfonic acid, bis[4-(4-aminophenoxy)phenyl]sulfone-sulfonic acid, 1,3-bis(4-aminophenoxy)benzene sulfonic acid, and (9,9-bis(4-aminophenyl)fluorene sulfonic acid. Hereinafter, 2,2'-benzidine-disulfonic acid is abbreviated to BDS, diaminobenzene sulfonic acid is abbreviated to DABS, (4,4'-diaminodiphenyl ether)sulfonic acid is abbreviated to S-DPE, 2,2'-bis[4-(4-aminophenoxy)phenyl]propanesulfonic acid is abbreviated to S-BAPP, and bis[4-(4-aminophenoxy)phenyl]sulfone-sulfonic acid is abbreviated to S-BAPS.

Further, the sulfonated diamine is preferably a compound having at least one aromatic ring in a molecule thereof, more preferably a compound in which sulfonic acid is bonded to an aromatic ring. Among the examples of the sulfonated diamine, BDS, DABS, S-DPE, S-BAPP and S-BAPS are particularly preferable in view of reactivity with the first compound and proton conductivity.

One example of the polyurea electrolyte using the above-described first and second compounds may be polyurea resin represented by the chemical formula 6. The polyurea resin represented by the chemical formula 6 is obtained by the polymerization of an isocyanate compound in which terminal carboxylic acid of monocyclic dimer acid obtained by the dimerization of olein acid and linoleic acid is substituted by an isocyanate group, and (4,4'-diaminodiphenyl ether)disulfonic acid.

As described above, the polyurea electrolyte according to the present embodiment has a urea bond in the molecule thereof. Since the urea bonding site forms a hard segment with high cohesion energy, the electrolyte having an excellent mechanical strength can be obtained. In addition, the polyurea electrolyte has a structure formed of ten or more carbon chains in the molecule. Since the carbon chains form a soft segment, the electrolyte having excellent flexibility can be also obtained.

The reason the polyurea electrolyte according to the present embodiment has excellent resistance to acid and resistance to water is not clarified. However, the ten or more carbon chains present in the molecule have a relatively high hydrophobic property, so as to protect the urea bonding site against the approach of acid and water that may cause decomposition of the urea bonding site. Thus, the polyurea electrolyte may have excellent resistance to acid and resistance to water.

In addition, when the compound (a) in which the both terminals of conjugated diene glycol and the hydrogenated substance thereof are substituted by an isocyanate group or the compound (b) in which the both terminals of vegetable oil containing a hydroxyl group, a carboxylic acid group or an amine group are substituted by an isocyanate group is used as the first compound, the urethane bond (—NHC(=O)O—) may be included in the first compound. Further, the urethane bonding site may also be decomposed due to acid and water. However, since the ten or more carbon chains present in the molecular in the polyurea electrolyte according to the present embodiment have a relatively strong hydrophobic property, the urethane bonding site is protected against acid and water, and prevented from decomposition.

As described above, the polyurea electrolyte according to the present embodiment contains the polyurea resin formed by the polymerization of the first compound having two or more isocyanate groups and the second compound having two or more amino groups, in which the first compound or the second compound contains a sulfonic acid group (—SO$_3$H) or a carboxylic acid group (—CO$_2$H). On the other hand, in the polyurea electrolytes described in Patent Literatures 1 and 2, the sulfonic acid group or the carboxylic acid group is introduced into the urea bonding site of the polyurea resin in the later step. In other words, in Patent Literatures 1 and 2, the sulfonic acid group or the like is directly bonded to the urea bonding site. In such a case, the cohesion force at the urea bonding site is decreased. However, in the polyurea electrolyte according to the present embodiment, the sulfonic acid group or the carboxylic acid group is not bonded to the urea bonding site, but the sulfonic acid group or the carboxylic acid group is bonded to the molecular chains R$^1$ and R$^2$ of the first compound and the second compound. Therefore, since the cohesion force at the urea bonding site is high, the electrolyte having an excellent mechanical strength can be obtained.

[Chem. 6]

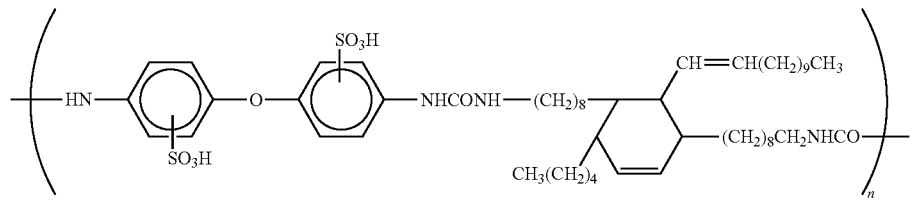

[Method for Manufacturing Polyurea Electrolyte]

The method for manufacturing the polyurea electrolyte according to the embodiment of the present invention includes the following steps:

(a) a step of neutralizing the sulfonic acid group or the carboxylic acid group of the first compound or the second compound by a neutralizing agent;

(b) a step of polymerizing the first compound and the second compound after the neutralizing step; and (c) a step of removing the neutralizing agent from the polymer of the first compound and the second compound after the polymerizing step.

The manufacturing method described above is characterized by the use of a neutralizing agent with respect to the sulfonic acid group or the carboxylic acid group, and more particularly, is characterized by the use of a particular neutralizing agent with respect to a sulfonated diamine that is the second compound. Usually, a sulfonated diamine is not easily dissolved in a solvent. However, due to the use of a particular neutralizing agent, solubility in a solvent can be improved simultaneously with neutralization. It is conventionally known that solubilization of a sulfonated diamine can be made by use of a neutralizing agent. However, the inventors of the present invention found out, as a result of the keen analyses, that solubility of the first compound in a solvent is improved due to neutralization of the sulfonated diamine by particular alkylamine, so that the sulfonated diamine and the first compound properly react with reach other.

As for such a neutralizing agent, it is preferable to use an aliphatic tertiary amine and a cyclic tertiary amine. One example of the aliphatic tertiary amine is trialkylamine. Examples of the cyclic tertiary amine include pyridine as a compound having one nitrogen atom, and triethylenediamine, 1,8-diazabicyclo[5.4.0]undecene-7, and 1,5-diazabicyclo[4.3.0]nonene-7 as a compound having two nitrogen atoms. Hereinafter, triethylenediamine is abbreviated to TEDA, 1,8-diazabicyclo[5.4.0]undecene-7 is abbreviated to DBU, and 1,5-diazabicyclo[4.3.0]nonene-7 is abbreviated to DBN.

Among these aliphatic tertiary amines and cyclic tertiary amines, trialkylamine having a long-chain alkyl group is preferable. The carbon number of the alkyl group of trialkylamine having a long-chain alkyl group is 6 or more, preferably 8 or more, more preferably 10 or more, still more preferably 12 or more. Particularly, it is suitable to use dodecyl dimethyl amine having an alkyl group with the carbon number of 12.

The neutralizing agent may be added stoichiometrically within a range of 0.9 to 1.1 moles per mole of the sulfonic acid group or the carboxylic acid group. The additive amount of the neutralizing agent is more preferably 1.0 moles per mole of the sulfonic acid group or the carboxylic acid group.

The removing method of the neutralizing agent and the proton substitution method may be conventionally known methods and are not particularly limited. For example, a composition is subjected to the proton substitution by use of a hydrochloric acid aqueous solution or a hydrochloric acid-alcohol mixed solution, followed by washing and drying, so as to remove the neutralizing agent. In this case, the composition may be in a block state, a membrane state, or any other state. However, the composition is preferably subjected to the neutralization and proton substitution after the film formation.

There are no particular limitations on the polymerization method of the first compound and the second compound in the polyurea electrolyte according to the present embodiment, and a conventionally known method such as a solution polymerization method, an interface polymerization method, a suspension polymerization method and an emulsion polymerization method may be used.

In the case of the solution polymerization method, for example, the second compound having the sulfonic acid group or the carboxylic acid group is neutralized and dissolved in a solvent using the neutralizing agent, and the first compound is then added thereto, so that the first compound and the second compound are polymerized. As for the solvent used in this case, a conventionally known solvent as a urethane solvent such as dimethylformamide, dimethylacetamide, dimethyl sulfoxide and N-methylpyrrolidone may be used. The polymerization temperature is generally between 20° C. and 150° C., preferably between 40° C. and 120° C. When the polymerization temperature is within the above-mentioned range, the polymerization reaction is efficiently promoted. Moreover, a side reaction causing cross-linkage can be prevented.

In the case of the interface polymerization, the second compound that has been neutralized is dissolved in a hydrophilic solvent, and the first compound is dissolved in a hydrophobic solvent, so that the first compound and the second compound are polymerized at the interface therebetween.

In the above-described manufacturing method, the polymerization reaction may be promoted by use of a conventionally known catalyst for urethane as necessary. There are no particular limitations on such a polymerizing catalyst, but examples thereof include organotin (for example, dibutyltin dilaurate and octyl tin) and a tertiary amine (for example, TEDA, DBU and DBN). Among these, a tertiary amine is preferable, and DBU and DBN are more preferable. Generally, when a sulfonated diamine is used for the second compound, a polymer having a high molecular weight may not be prepared efficiently because of low reactivity. However, when the catalyst is used, a polymer having a high molecular weight can be prepared efficiently.

In the above-described manufacturing method, other additives may be used as necessary in order to improve the performance of the electrolyte. Examples of the additives include olefinic emulsions (such as polyethylene emulsion, EPDM emulsion, polybutadiene, polyisoprene and polystyrene isoprene). However the additives are not particularly limited to these. These additives are preferably added to the solvent at the time of polymerization.

In the above-described manufacturing method, when the first compound and the second compound are polymerized, the molecular weight of the polymer may be improved by irradiation of microwaves to the reaction solution. The microwaves are electromagnetic waves having a wavelength between 1 m (frequency of 300 MHz) and 1 mm (frequency of 300 GHZ). The microwaves preferably have a frequency between 300 MHz and 3 GHz in view of a reaction promotion effect. For example, microwaves with a frequency of 2.45 GHz generally used for heating may be used.

[Fuel Cell and Vehicle]

The fuel cell according to the embodiment of the present invention is characterized by the polyurea electrolyte used as an electrolyte membrane for a fuel cell. As described above, the polyurea electrolyte of the present invention has excellent flexibility, mechanical strength, resistance to acid, resistance to water and durability. In addition, the polyurea electrolyte has high proton conductivity since the sulfonic acid group or the carboxylic acid group is bonded thereto. Therefore, when the electrolyte of the present invention is used for an electrolyte membrane for a fuel cell, a membrane electrode assembly (MEA) having excellent resistance to acid, resistance to water, durability and mechanical strength can be obtained. Moreover, since such a membrane electrode assembly can be reduced in thickness, the fuel cell can be further downsized and achieve higher output performance.

The electrolyte membrane for a fuel cell formed of the polyurea electrolyte may be used for a direct methanol fuel cell (DMFC) and a polymer electrolyte fuel cell (PEFC). FIG. 1 shows a structure of a single cell of a polymer electrolyte fuel cell in which the polyurea electrolyte is used as an electrolyte membrane. As shown in FIG. 1, the fuel cell (single cell) 10 has a membrane electrode assembly in which a positive electrode 2 and a negative electrode 3 are assembled and integrated on each side of a solid polymer electrolyte membrane 1. The respective positive electrode 2 and negative electrode 3 have a double layer structure of a catalyst layer 4 and a gas diffusion layer 5 (GDL). The catalyst layer 4 is in contact with the solid polymer electrolyte membrane 1. The respective sides of the positive electrode 2 and the negative electrode 3 are provided with a positive electrode separator 6 and a negative electrode separator 7. In addition, an oxygen gas flow path, a hydrogen gas flow path and a coolant flow path are formed in the positive electrode separator 6 and the negative electrode separator 7.

In the fuel cell 10, mixed gas of hydrogen, nitrogen and water vapor is supplied to the negative electrode 3, and air and water vapor are supplied to the positive electrode 2. Hydrogen in the fuel is electrochemically oxidized in the negative electrode 3, so that protons and electrons are generated. The protons flow into the positive electrode 2 through the electrolyte membrane 1. On the other hand, the electrons generated in the negative electrode 3 pass through an external load 8 connected to the fuel cell 10 to flow into the positive electrode 2. Thereafter, the protons, oxygen and the electrons react with each other in the positive electrode 2, so as to generate water.

The electrolyte membrane 1 using the polyurea electrolyte according to the present embodiment has excellent toughness represented by mechanical strength, particularly tear strength. Therefore, a decrease in thickness of the electrolyte membrane can be easily achieved as compared with a conventional electrolyte membrane. That is, the electrolyte membrane 1 may have an arbitrary thickness depending on the situation. However, it is preferable to form the electrolyte membrane 1 thinly in view of proton conductivity, and the thickness thereof is generally between 1 μm and 200 μm. When the thickness is within this range, the electrolyte membrane having both excellent proton conductivity and mechanical strength can be achieved.

When the polyurea electrolyte is used as an electrolyte membrane for a direct methanol fuel cell, the thickness is 200 μm or less, preferably 100 μm or less, more preferably 50 μm or less, still more preferably 20 μm or less, particularly preferably 10 μm or less, quite preferably 5 μm or less, most preferably 1 μm. When the polyurea electrolyte is used as an electrolyte membrane for a polymer electrolyte fuel cell, the thickness is 30 μm or less, preferably 20 μm or less, more preferably 10 μm or less, still more preferably 5 μm or less, particularly preferably 1 μm.

When the polyurea electrolyte is used in an electrolyte membrane for a fuel cell, other fluorine electrolytes and hydrocarbon electrolytes may be mixed in addition to the polyurea electrolyte. However, the content of the polyurea electrolyte according to the present invention in the electrolyte membrane is preferably 50% by weight or more, more preferably 80% by weight or more. Alternatively, the electrolyte membrane may be composed only of the polyurea electrolyte according to the present invention.

There are no particular limitations on the method for forming the polyurea electrolyte according to the present invention into an electrolyte membrane used in a fuel cell, and conventionally known various methods may be used. In particular, the first compound and the second compound are polymerized, and subsequently, a neutralizing agent is removed therefrom by use of a hydrochloric acid aqueous solution or the like, followed by washing and drying, so as to obtain an electrolyte membrane.

The catalyst layer in the fuel cell preferably contains an electrically conductive material, a binder, and catalyst metal. There are no particular limitations on the electrically conductive material as long as the electrically conductive material has electrical conductivity, and various metals and carbon materials may be used. Examples of the electrically conductive material include carbon black such as acethylene black, active carbon and graphite, which may be used singly, or may be used as a mixture thereof.

It is preferable to use the polyurea electrolyte as a binder. However, there are no particular limitations on the binder, and resins may be added to the binder. In such a case, one example of the resins to be added may be fluorine resin having a water repellent property. A melting point of the fluorine resin to be used is preferably 400° C. or less, and examples of the fluorine resin include polytetrafluoroethylene and a tetrafluoroethylene-perfluoroalkylvinylether copolymer. However, the fluorine resin is not particularly limited to these examples.

There are no particular limitations on the catalyst metal as long as the catalyst metal promotes an oxidation reaction of hydrogen and a reduction reaction of oxygen. Examples of the catalyst metal include lead, iron, manganese, cobalt, chromium, gallium, vanadium, tungsten, ruthenium, iridium, palladium, platinum and rhodium, and alloys thereof.

Figure 2:
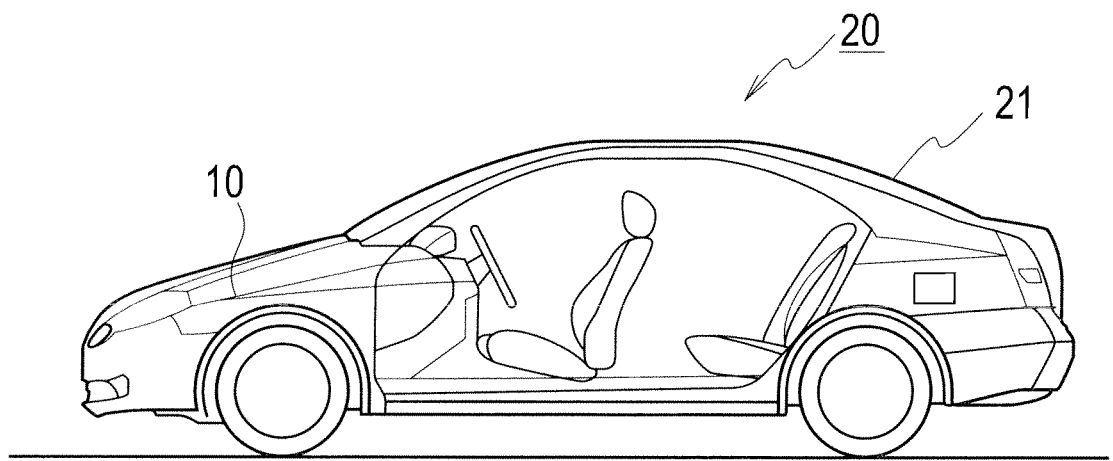
FIG. 2 is a schematic view showing a vehicle on which a fuel cell according to an embodiment of the present invention is installed.

The fuel cell having the electrolyte membrane according to the present invention has excellent durability. Therefore, the fuel cell is preferably used for a vehicle, which is frequently subjected to starting and stopping of the system and output fluctuations. FIG. 2 shows an external appearance of a vehicle 20 on which the fuel cell 10 according to the present invention is installed. The fuel cell 10 is installed on the fuel cell vehicle shown in FIG. 2 at the front portion of a vehicle body 21. However, there are no particular limitations on the location of the fuel cell 10 to be installed.

EXAMPLES

Hereinafter, the present invention will be explained in more detail with reference to the examples. However, the present invention is not limited to these examples.

(Measurement Method of Equivalent Weight)

An ion exchange capacity (IEC) was measured and converted to calculate an equivalent weight (EW) of the electrolyte. The IEC was measured as follows. First, approximately 0.1 g of a proton electrolyte was weighed out, and the weighed electrolyte was impregnated with 20 ml of 0.1 N of a sodium hydroxide aqueous solution. Subsequently, the mixture thus obtained was left on overnight while being stirred at room temperature. Thereafter, the mixture was subjected to neutralizing titration of which the end point was pH 7.0 by use of 0.1 N of a hydrochloric acid aqueous solution by an automatic titrator (manufactured by DKK-TOA Corporation) and a pH composite electrode (manufactured by DKK-TOA Corporation). The amount of sodium hydroxide consumed by the ion exchange of the electrolyte was measured according to the titer of hydrochloric acid, so as to calculate the ion exchange capacity according to the formula (1).

$$\text{Ion exchange capacity (meq/g)} = 0.1 \times (20 \times F^1 - A \times F^2)/W \quad (1)$$

In the formula, $F^1$ represents a factor of the sodium hydroxide aqueous solution for the titration, $F^2$ represents a factor of the hydrochloric acid aqueous solution for the titration, A represents a titer (ml) of the hydrochloric acid aqueous solution, and W represents a membrane weight (g).

The EW was calculated according to the IEC obtained as described above based on the formula (2).

$$EW = 1000/IEC \quad (2)$$

Note that, resistance to water, resistance to acid and membrane strength were evaluated after the electrolyte was formed into an electrolyte membrane.

(Evaluation Method of Resistance to Water)

The electrolyte membrane was put into 50 ml of pure water, and left at 105° C. After 20 hours, the membrane was taken out of the water, and dried under reduced pressure at 80° C. over 15 hours. Then, the appearance of the membrane was observed by a stereoscopic microscope. The criteria for evaluation of resistance to water are as follows.

◯: Smooth and no crack on membrane surface

×: Not able to keep in membrane state, or some cracks on membrane surface (Evaluation Method of Resistance to Acid)

The electrolyte membrane was dried under reduced pressure at 80° C., and the dry weight before the test (w1) was measured. Subsequently, the dried electrolyte membrane was put into 50 ml of 10% by weight of the hydrochloric acid aqueous solution, and left at 80° C. After 20 hours, the electrolyte membrane was taken out of the solution, and washed with a large amount of pure water, followed by drying under reduced pressure at 80° C. Thus, the dry weight after the test (w2) was measured. Then, the weight reduction rate was calculated according to the dry weights before and after the test based on the formula (3).

$$\text{Weight reduction rate (\%)} = (w1 - w2)/w1 \times 100 \quad (3)$$

In the evaluation, as the weight reduction rate is lower, the electrolyte membrane shows better resistance to acid. On the other hand, as the weight reduction rate is higher, the electrolyte membrane shows inferior resistance to acid.

(Evaluation Method of Membrane Strength)

The membrane strength was evaluated by a folding test and a tensile test with respect to the electrolyte membrane after the evaluation of resistance to water. In the folding test, the electrolyte membrane was folded in the middle, and then restored to its original state, so as to observe the middle portion of the electrolyte membrane. In the tensile test, the electrolyte membrane was pulled up to the tensile elongation of 100%, and then restored to its original state, so as to observe the surface state of the membrane. The criteria for evaluation of membrane strength are as follows.

◯: No fracture or mark along fold line after folding test, and no fracture in tensile test ×: Cause fracture or mark along fold line after folding test, and cause fracture in tensile test. In addition, membrane is soluble in water.

Example 1

First, 1.00 g of a diisocyanate derivative (trade name: DDI-1410, manufactured by Cognis Japan Ltd.) was dissolved in 2.29 g of dioxane to prepare a solution (I). In addition, 0.30 g of a sulfonated diamine and 0.114 g of a neutralizing agent (triethylamine) were added and dissolved in 2.7 g of N,N-dimethylformamide to prepare a solution (II). Subsequently, the solution (I) and the solution (II) were mixed in a pressure vessel, and then polymerized while being stirred at 100° C. for 24 hours. The polymerized solution was poured into a cap made of polyethylene, and dried at 80° C. for 12 hours. After drying, the neutralizing agent was removed so as to obtain an electrolyte membrane. The IEC of the electrolyte membrane was 1.24 (EW: 806). In addition, the electrolyte membrane showed good resistance to water and membrane strength. Hereinafter, N,N-dimethylformamide is abbreviated to DMF, and triethylamine is abbreviated to TEA. Note that, the above-described DDI-1410 manufactured by Cognis Japan Ltd. is a compound in which terminal carboxylic acid of monocyclic dimer acid obtained by the dimerization of olein acid and linoleic acid is substituted by an isocyanate group.

Example 2

Synthesis of
(4,4'-diaminodiphenylether)-2,2-disulfonic acid
(S-DPE)

20 g of 4,4'-oxydianiline was dissolved in 17 ml of 95% sulfuric acid, and the solution was cooled to 0° C. Subsequently, 35 ml of oleum (sulfur trioxide content: 60%) was added dropwise in the cooled solution. The solution was stirred at 80° C. for one hour, cooled to room temperature, and further cooled with ice water, so as to precipitate a solid content and then filtrate. In addition, the filtrated solid content was dissolved in a sodium hydroxide solution, and hydrochloric acid was added thereto. Thereafter, the precipitated solid content was filtrated, washed and dried, so as to obtain a product. It was revealed, by a proton nuclear magnetic resonance spectroscopy, that the product thus obtained was 4,4-diaminodiphenylether-2,2-disulfonic acid having the structure of the chemical formula 7.

[Chem. 7]

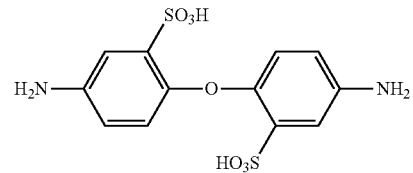

<Preparation of Electrolyte Membrane>

First, a solution (I) in which 2.50 g of the sulfonated diamine (S-DPE) synthesized as described above, 22.50 g of ion exchange water, and 1.55 g of a neutralizing agent (TEA) were dissolved, and a solution (II) in which a diisocyanate derivative (DDI-1410) was dissolved in toluene so as to have 20% by weight of the diisocyanate derivative, were prepared. Subsequently, 5.31 g of the solution (I) and 4.39 g of the solution (II) were poured into a pressure vessel, and polymerized while being stirred at 100° C. for 30 hours. The polymerized liquid produced at the interface was treated in a similar manner to Example 1, so as to obtain an electrolyte membrane. The IEC of the electrolyte membrane was 1.20 (EW: 833). In addition, the electrolyte membrane showed good resistance to water and membrane strength. The weight reduction rate in the test for resistance to acid was as low as 0.8%, which was a good result. Thus, the electrolyte membrane having quite good resistance to acid was obtained.

Example 3

An isocyanate derivative (TDI-80) was added to liquid polybutadiene having a hydroxyl group at both terminals thereof (trade name: R-15HT, manufactured by Idemitsu Kosan Co., Ltd.), so as to form a prepolymer in which NCO (isocyanate group) was 5.14%. The prepolymer thus obtained was dissolved in dioxane, so as to prepare a solution (I) having 50% by mass of the prepolymer. In addition, 0.50 g of the sulfonated diamine (S-DPE) synthesized in Example 2 and 0.28 g of a neutralizing agent (TEA) were added and dissolved in 4.50 g of dimethyl sulfoxide, so as to prepare a solution (II). Thereafter, 4.78 g of the solution (I) was added to the solution (II) in a pressure vessel, and polymerized while being stirred at 80° C. for 3 hours. The polymerized solution was treated in a similar manner to Example 1, so as to obtain an electrolyte membrane. The IEC of the electrolyte membrane was 1.09 (EW: 917). In addition, the electrolyte membrane showed good resistance to water and membrane strength. Note that, TDI-80 described above is a mixture of 80% toluene-2,4-diisocyanate and 20% toluene-2,6-diisocyanate.

Example 4

1.30 g of a sulfonated diamine (DABS) was suspended in 13 g of DMF, and 1.47 g of a long-chain tertiary amine (dimethyllaurylamine, manufactured by NOF Corporation, trade name: Nissan amine BB) was added thereto as a neutralizing agent, so as to prepare a solution (I) in which DABS was completely dissolved. In addition, a diisocyanate derivative (DDI-1410) was dissolved in DMF to prepare a solution (II) having 50% by weight of the diisocyanate derivative. Subsequently, 3.25 g of the solution (I), 1.76 g of the solution (II) and a catalyst (DBU) were added in a pressure vessel in such a manner that the total content thereof was 1% by weight with respect to the diisocyanate derivative, and then polymerized while being stirred at 60° C. for 24 hours. The polymerized liquid thus obtained was treated in a similar manner to Example 1, so as to obtain an electrolyte membrane. The IEC of the electrolyte membrane was 1.23 (EW: 813). In addition, the electrolyte membrane showed good resistance to water and membrane strength.

Example 5

An electrolyte membrane was obtained in a similar manner to Example 4, except that microwaves with a frequency of 2.45 GHz was irradiated at 60° C. for 10 minutes by use of a microwave applicator provided with a radiation thermometer (manufactured by CEM Corporation, Discover, single-mode type). The IEC of the electrolyte membrane was 1.20 (EW: 833). In addition, the electrolyte membrane showed good resistance to water and membrane strength.

Example 6

Synthesis of bis[4-(4-aminophenoxy)phenyl]sulfone-3,3'-disulfonic acid (S-BAPS)

25 g of bis[4-(4-aminophenoxy)phenyl]sulfone was dissolved in 17 ml of 95% sulfuric acid, and the solution was cooled to 0° C. Subsequently, 35 ml of oleum (sulfur trioxide content: 60%) was added dropwise in the cooled solution. The solution was stirred at 80° C. for one hour, cooled to room temperature, and further cooled with ice water, so as to precipitate a solid content and then filtrate. In addition, the filtrated solid content was dissolved in a sodium hydroxide solution, and hydrochloric acid was added thereto. Thereafter, the precipitated solid content was filtrated, washed and dried, so as to obtain a product. The product thus obtained was dissolved in deuterated dimethyl sulfoxide to which a small amount of triethylamine (TEA) was added. Then, TEA salt of the product was analyzed by a proton nuclear magnetic resonance spectroscopy. As a result, signals based on hydrogen of the alkyl group of TEA were observed in 1.00 to 1.18 ppm and in 2.70 to 2.82 ppm. In addition, signals based on hydrogen of benzene ring were observed in 6.59 to 6.62 ppm (d), in 6.73 to 6.76 ppm (d), in 7.72 to 7.75 ppm (d) and in 8.20 ppm (s). According to the attribution and the integral intensity ratio of the respective signals, it was revealed that the product was bis[4-(4-aminophenoxy)phenyl]sulfone-3,3'-disulfonic acid having the structure of the chemical formula 8.

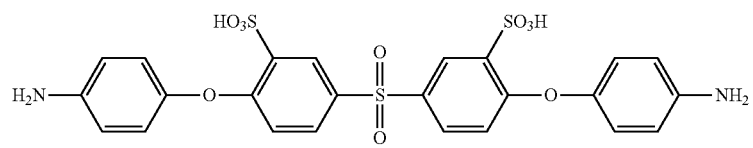

[Chem. 8]

<Preparation of Electrolyte Membrane>

2.41 g of dimethylformamide, 0.2 g of the sulfonated diamine (S-BAPS) synthesized as described above, and 0.068 g of TEA were poured and dissolved in an airtight container with a 20 ml capacity, so as to prepare an S-BAPS salt solution. Subsequently, 0.58 g of the prepolymer in which the isocyanate derivative was added to the liquid polybutadiene having the hydroxyl group at both terminals thereof used in Example 3 was dissolved in 5.2 g of dioxane, so as to prepare a prepolymer solution. The prepolymer solution thus obtained was added to the S-BAPS salt solution, and substituted by nitrogen and stirred, so as to prepare a reaction liquid. Thereafter, the reaction liquid was poured into a silicone container, and dried overnight at 80° C., so as to obtain an electrolyte membrane. The IEC of the electrolyte membrane was 1.06 (EW: 943). In addition, the electrolyte membrane showed good resistance to water and membrane strength.

Example 7

The membrane before the proton substitution prepared in Example 1 was used, and examined by the proton substitution method. More specifically, the polymerized solution prepared in Example 1 was poured into a cap made of polyethylene, and then dried at 80° C. for 12 hours. The dried membrane thus obtained was immersed in a methanol hydrochloride solution in which concentrated hydrochloric acid was diluted with methanol by 1 mol/L, followed by treatment at 50° C. for 15 hours, so as to obtain an electrolyte membrane. The IEC of the electrolyte membrane was 1.2 (EW: 833), and the electrolyte membrane showed good resistance to water and membrane strength. In addition, the tear strength of the electrolyte membrane was 500 to 1000 N/m.

Comparative Example 1

3.46 g of the solution (II) prepared in Example 1 and 1.49 g of a prepolymer with 9.47% NCO in which an isocyanate derivative (TDI-80) was added to both terminals of pentamethylene glycol were added to a pressure vessel, and polymerized at 80° C. for 24 hours. The polymerized liquid thus obtained was treated in a similar manner to Example 1, so as to obtain an electrolyte membrane. The strength of the electrolyte membrane thus obtained was quite low, and a number of cracks were caused. The IEC of the electrolyte membrane was 1.04 (EW: 962). However, the shape of the sample membrane after the test for resistance to water was hardly maintained.

Comparative Example 2

0.53 g of urethane-modified MDI (manufactured by BASF INOAC Polyurethanes Ltd., trade name: Lupranate MP-102) was added to 3.00 g of the solution (II) prepared in Example 1 in a pressure vessel, and polymerized at 80° C. for 24 hours. The polymerized liquid thus obtained was treated in a similar manner to Example 1, so as to obtain an electrolyte membrane. Although the entire membrane was manufactured uniformly, the membrane strength was low, and a number of cracks were caused. The IEC of the electrolyte membrane was 0.92 (EW: 1087). However, the shape of the sample membrane after the test for resistance to water was hardly maintained. The weight reduction rate in the test for resistance to acid was 21.3%.

Comparative Example 3

0.50 g of isocyanate (TDI) and 0.50 g of DMF were mixed, so as to prepare a solution (1) in which isocyanate was 50% by weight. Thereafter, 0.3 g of the solution (1) and 3.17 g of the solution (II) prepared in Example 3 were poured in a pressure vessel, and then polymerized at 80° C. for 24 hours. The polymerized liquid thus obtained was dried in a similar manner to Example 1 to remove the neutralizing agent. However, the electrolyte thus obtained was soluble in water, and an electrolyte membrane could not be obtained.

Comparative Example 4

3.17 g of the solution (I) prepared in Example 3 and 0.32 g of urethane-modified MD1 (manufactured by BASF INOAC Polyurethanes Ltd., trade name: Lupranate MP-102) were poured in a pressure vessel, and then polymerized at 80° C. for 24 hours. The polymerized liquid thus obtained was dried in a similar manner to Example 1 to remove the neutralizing agent. However, the electrolyte thus obtained was soluble in water, and an electrolyte membrane could not be obtained.

Table 1 shows the evaluation results of Examples 1 to 7 and Comparative Examples 1 to 4. As shown in Table 1, the respective Examples 1 to 7 could obtain the electrolyte membrane having good resistance to water, resistance to acid and membrane strength as compared with Comparative Examples 1 to 4. According to Comparative Examples 1 to 4, it was revealed that, when the carbon chain number of the first compound was less than 10, the obtained electrolyte membrane had poor resistance to water, and the membrane strength thereof was low.

TABLE 1

| | First Compound | Number of Carbon Chains | Second Compound | Neutralizing Agent | IEC | EW | Resistance to Water | Weight Reduction Rate (%) | Resistance to Water Membrane Strength |
|---|---|---|---|---|---|---|---|---|---|
| Example 1 | DDI-1410 | 23 | DABS | TEA | 1.24 | 806 | ○ | | ○ |
| Example 2 | DDI-1410 | 23 | S-DPE | TEA | 1.20 | 833 | ○ | 0.8 | ○ |
| Example 3 | R-15HT | Approximately 80 | S-DPE | TEA | 1.09 | 917 | ○ | | ○ |
| Example 4 | DDI-1410 | 23 | DABS | BB | 1.23 | 813 | ○ | | ○ |
| Example 5 | DDI-1410 | 23 | DABS | BB | 1.24 | 806 | ○ | | ○ |
| Example 6 | R-15HT | Approximately 80 | S-BAPS | TEA | 1.06 | 943 | ○ | | ○ |
| Example 7 | DDI-1410 | 23 | DABS | TEA | 1.2 | 833 | ○ | | ○ |
| Comparative Example 1 | PMG | 5 | DABS | TEA | 1.04 | 962 | x | | x |
| Comparative Example 2 | MDI | 8 | DABS | TEA | 0.92 | 1087 | x | 21.3 | x |
| Comparative Example 3 | TDI | 5 | S-DPE | TEA | — | — | x | | x |
| Comparative Example 4 | MDI | 8 | S-DPE | TEA | — | — | x | | x |

Example 8

An electrolyte membrane was prepared in a similar manner to Example 1, except that the amount of the diisocyanate derivative used in Example 1 was reduced from 1.00 g to 0.95 g, and the reaction temperature of the solution (I) and the solution (II) was changed from 100° C. to 60° C. In Example 8, NCO Index was 1.00. Note that, NCO Index is a ratio ([NCO]/[NH$_2$]) of the number of moles of the isocyanate group in the first compound and the number of moles of the amino group in the second compound.

The molecular weight of the electrolyte membrane obtained in Example 8 was measured by a gel permeation chromatography. As a result, the weight average molecular weight (Mw) was 130000. For the record, NCO Index in Example 1 was 1.05, and the weight average molecular weight of the electrolyte membrane obtained in Example 1 was 80000. According to Example 1 and Example 8, it is recognized that NCO Index preferably approximates 1.00 in order to increase the molecular weight of the polyurea electrolyte.

Examples 9 to 15

Respective electrolyte membranes were prepared under the same conditions as Example 1, except that the first compound, the second compound, the solvent, the concentration of the raw material, NCO Index and the reaction temperature were changed as shown in Table 2. In addition, in Examples 10 and 13, dibutyltin dilaurate (manufactured by Nitto Kasei Co., Ltd., trade name: Neostann U-100) was used as a polymerization catalyst. Table 3 shows the evaluation results of the obtained electrolyte membranes and the polymerized solutions of the respective examples.

Note that, the viscosities shown in Table 3 are ones in the case in which the concentrations of the polymerized solutions are 20% and 40%. In addition, the viscosities of the polymerized solutions were measured at the respective concentrations using a viscometer (manufactured by Brookfield Engineering Labs, trade name: Rheometer HBDV-III-CP).

The NCO reaction rate in Table 3 is a value defined according to the following formula (4) based on the result obtained from the observation of the reaction liquid at the reaction end point by use of a Fourier transform infrared spectrophotometer (FT-IR).

$$\text{NCO reaction rate (\%)} = (1 - Xt/X0) \times 100 \quad (4)$$

$A^1$: Absorbance in 2272 cm$^{-1}$
$A^2$: Absorbance in 2852 cm$^{-1}$
X: NCO existential index (=$A^1/A^2$)
$X_0$: NCO existential index at 0-minute reaction time
$X_t$: NCO existential index at t-minute reaction time The branching/cross-linking amount in Table 3 is a ratio (=B/(A+B)) of an integral value (A) of the signals adjacent to 6.0 ppm derived from the urea bond (—NHCONH—) observed by a proton nuclear magnetic resonance spectroscopy, and an integral value (B) of the signals adjacent to 5.7 ppm derived from the burette bond (—N(CONH—)CONH—) generated by the additional reaction of NH in the urea bond with NCO, which brings the branching/cross-linking structure.

As shown in Table 3, the ion exchange capacity (IEC) was 1.25 or less, and the equivalent weight (EW) was 1000 or less in the respective electrolyte membranes of Examples 9 to 15. In addition, the respective electrolyte membranes had good resistance to water and membrane strength.

The entire content of Japanese Patent Application No. P2009-146304 (filed on Jun. 19, 2009) is herein incorporated by reference.

Although the present invention has been described above by reference to the embodiment and the examples, the present invention is not limited to those, and it will be apparent to these skilled in the art that various modifications and improvements can be made.

INDUSTRIAL APPLICABILITY

The polyurea electrolyte according to the present invention has an excellent mechanical strength, resistance to water, resistance to acid and durability. Therefore, the polyurea electrolyte according to the present invention can be appropriately applied to an electrolyte membrane and a binder for an electrode catalyst in various fuel cells such as a fuel cell for a vehicle, a fuel cell for mobile communication equipment and a fuel cell for household use.

REFERENCE SIGNS LIST

1 Electrolyte membrane
2 Positive electrode
3 Negative electrode
4 Catalyst layer
5 Gas diffusion layer
6 Positive electrode separator
7 Negative electrode separator
8 External load
10 Fuel cell

TABLE 2

|  | First Compound Second Compound | Solvent | Catalyst | Raw Material Concentration (%) | NCO Index | Reaction Temperature (° C.) |
| --- | --- | --- | --- | --- | --- | --- |
| Example 9 | DDI-1410 DABS | NMP | — | 20 | 1.05 | 60 |
| Example 10 | DDI-1410 DABS | NMP | ∘ | 40 | 1.05 | 100 |
| Example 11 | DDI-1410 DABS | NMP | — | 40 | 1.05 | 100 |
| Example 12 | DDI-1410 DABS | NMP | — | 40 | 1 05 | 60 |
| Example 13 | DDI-1410 DABS | NMP | ∘ | 40 | 1.05 | 60 |
| Example 14 | DDI-1410 DABS | NMP | — | 40 | 1.00 | 60 |
| Example 15 | DDI-1410 DABS | DMF Dioxane | — | 20 | 1.00 | 60 |

TABLE 3

|  | Viscosity (Concentration 20%) (cP) | Viscosity (Concentration 40%) (cP) | NCO Reaction Rate (%) | IEC | EW | Branching/ Crosslinking Amount | Resistance to Water Membrane Strength |
| --- | --- | --- | --- | --- | --- | --- | --- |
| Example 9 | 467 | — | 85 | 1.22 | 820 | 6 | ∘ |
| Example 10 | 2568 | 263741 | 96 | 1.03 | 971 | 14 | ∘ |
| Example 11 | 654 | 167045 | 98 | 1.08 | 926 | 12 | ∘ |
| Example 12 | 659 | 38207 | 94 | 1.25 | 800 | 5 | ∘ |
| Example 13 | 659 | 32681 | 95 | 1.24 | 806 | 9 | ∘ |
| Example 14 | 959 | 199844 | 100 | 1.25 | 800 | 1.4 | ∘ |
| Example 15 | 22 | — | 78 | 1.16 | 862 | 11 | ∘ |

The invention claimed is:

1. A polyurea electrolyte, comprising:
a polyurea resin formed by polymerizing a first compound having two or more isocyanate groups and a second compound having two or more amino groups, the first compound containing ten or more carbon chains, and the second compound containing a sulfonic acid group or a carboxylic acid group,
wherein the first compound is one of the following (a) to (d) compounds:
(a) a compound in which both terminals of conjugated diene glycol or a hydrogenated substance thereof are substituted by an isocyanate group;
(b) a compound in which both terminals of vegetable oil containing a hydroxyl group, a carboxylic acid group or an amine group are substituted by an isocyanate group;
(c) a compound in which a carboxylic acid group or an amine group in vegetable oil containing a carboxylic acid group or an amine group is substituted by an isocyanate group; and
(d) dimer acid diisocyanate.

2. The polyurea electrolyte according to claim 1, wherein the second compound contains a sulfonic acid group or a carboxylic acid group, and has an aromatic ring.

3. The polyurea electrolyte according to claim 1, wherein an equivalent weight of the sulfonic acid group or the carboxylic acid group is between 300 and 2000.

4. A polyurea electrolyte membrane comprising the polyurea electrolyte according to claim 1, the polyurea electrolyte membrane having a thickness of 200 μm or less.

5. A fuel cell comprising the polyurea electrolyte membrane according to claim 4.

6. A vehicle comprising the fuel cell according to claim 5.

7. A method for manufacturing the polyurea electrolyte according to claim 1, the method comprising:
neutralizing the sulfonic acid group or the carboxylic acid group in the second compound by a neutralizing agent;
after the neutralizing, polymerizing the first compound and the second compound; and
after the polymerizing, removing the neutralizing agent from a polymer of the first compound and the second compound.

8. The method for manufacturing the polyurea electrolyte according to claim 7, wherein the neutralizing agent is alkylamine having a carbon number of 6 or more.

9. The method for manufacturing the polyurea electrolyte according to claim 7, wherein the polymerizing is carried out under a condition of microwave irradiation.

10. The polyurea electrolyte according to claim 1, wherein the second compound is a sulfonated diamine.

11. The polyurea electrolyte according to claim 1, wherein the second compound is at least any one of 2,2'-benzidinedisulfonic acid, diaminobenzene sulfonic acid, (4,4'-diaminodiphenyl ether)sulfonic acid, (4,4'-diaminodiphenyl sulfone) sulfonic acid, 2,2'-bis[4-(4-aminophenoxy)phenyl] propanesulfonic acid, bis[4-(4-aminophenoxy)phenyl] sulfone-sulfonic acid, 1,3-bis(4-aminophenoxy)benzene sulfonic acid, and (9,9-bis(4-aminophenyl)fluorene sulfonic acid.

12. The polyurea electrolyte according to claim 1, wherein the second compound contains a sulfonic acid group.

13. The polyurea electrolyte according to claim 1, wherein the second compound contains a carboxylic acid group.

* * * * *